US008976191B1

(12) United States Patent
Mendez Mendez (10) Patent No.: US 8,976,191 B1
(45) Date of Patent: Mar. 10, 2015

(54) CREATING A REALISTIC COLOR FOR A VIRTUAL OBJECT IN AN AUGMENTED REALITY ENVIRONMENT

(71) Applicant: QUALCOMM, Incorporated, San Diego, CA (US)

(72) Inventor: Erick Mendez Mendez, Vienna (AT)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/210,053

(22) Filed: Mar. 13, 2014

(51) Int. Cl.
*G09G 5/02* (2006.01)

(52) U.S. Cl.
CPC ....................................... *G09G 5/026* (2013.01)
USPC ........................................................... 345/589

(58) Field of Classification Search
CPC ........................................................ G09G 5/06
USPC ........................................................... 345/663
See application file for complete search history.

(56) References Cited

U.S. PATENT DOCUMENTS

| | | | |
|---|---|---|---|
| 6,633,304 B2* | 10/2003 | Anabuki et al. | 345/633 |
| 2009/0051682 A1 | 2/2009 | Lonsing | |
| 2012/0120088 A1 | 5/2012 | Kitahara | |
| 2013/0077854 A1 | 3/2013 | Kobayashi et al. | |

FOREIGN PATENT DOCUMENTS

JP  2010170316 A  8/2010

OTHER PUBLICATIONS

Oskam T., et al., "Fast and Stable Color Balancing for Images and Augmented Reality," 2012, pp. 4321-4328, Oct. 2012.
Martin Knecht, Christoph Traxler, Werner Purgathofer, Michael Wimmer. "Adaptive Camera-Based Color Mapping for Mixed-Reality Applications", In Proceedings of the 2011 IEEE International Symposium on Mixed and Augmented Reality (ISMAR 2011), pp. 165-168. Oct. 2011.
Georg Klein and David Murray, "Compositing for Small Cameras", In Proc. International Symposium on Mixed and Augmented Reality (ISMAR '08, Cambridge), Sep. 2008.

* cited by examiner

*Primary Examiner* — Edward Martello
(74) *Attorney, Agent, or Firm* — Blakely Sokoloff Taylor & Zafman, LLP (57) ABSTRACT

Disclosed is a method and apparatus for creating a realistic color for a virtual object in an Augmented Reality environment produced by an Augmented Reality application. In one embodiment, the functions implemented include: selecting a reference image target frame; selecting a plurality of sample points in the reference image target frame; acquiring a subsequent new image target frame; determining a plurality of corresponding sample points in the new image target frame wherein the plurality of corresponding sample points correspond to the plurality of sample points in the reference image target frame; comparing a color of each of the plurality of sample points in the reference image target frame with a color of each of the corresponding sample points in the new image target frame and computing a Color Transfer function based at least in part on the comparison; and applying the Color Transfer function to the color of the virtual object.

27 Claims, 6 Drawing Sheets

CREATING A REALISTIC COLOR FOR A VIRTUAL OBJECT IN AN AUGMENTED REALITY ENVIRONMENT

FIELD

The subject matter disclosed herein relates to electronic devices and, more particularly, to methods and apparatuses for use with augmented reality environments implemented by electronic devices.

BACKGROUND

Augmented Reality is a technology that involves the superimposition of computer graphics on the real world. For instance, the first-down line often seen in television broadcasts of American football games is one example of a limited application of Augmented Reality. When the superimposed object represents a physical object, it is desirable for the superimposed physical object to blend into the real world and appear realistic.

Augmented Reality applications are presently used to display a virtual object in the Augmented Reality environment. In particular, a live camera image may be rendered on the display to represent a view of the physical world. A virtual object may then be superimposed on the image target. The virtual object tracks the position and orientation of the image target in real-time so that the viewer's perspective on the virtual object corresponds with their perspective on the image target, and it appears that the virtual object is tightly coupled to the real world.

Although the virtual object tracks the position and orientation of the image target, in present implementations, virtual objects do not track the visual appearance, such as color, of the image target. For example, when there is a change of lighting conditions in the image target, the hue of the virtual object does not change accordingly, as a real object in the image target would. As a result, the realism of the virtual object is diminished.

SUMMARY

An embodiment disclosed herein may include a method of creating a realistic color for a virtual object in an Augmented Reality environment comprising: selecting a reference image target frame; selecting a plurality of sample points in the reference image target frame; acquiring a subsequent new image target frame; determining a plurality of corresponding sample points in the new image target frame wherein the plurality of corresponding sample points correspond to the plurality of sample points in the reference image target frame; comparing a color of each of the plurality of sample points in the reference image target frame with a color of each of the corresponding sample points in the new image target frame and computing a Color Transfer function based at least in part on the comparison; and applying the Color Transfer function to the color of the virtual object.

Another embodiment disclosed herein may include an apparatus for creating a realistic color for a virtual object in an Augmented Reality environment comprising: a memory; and a processor. The processor is coupled to the memory and is configured to execute instructions to: select a reference image target frame; select a plurality of sample points in the reference image target frame; acquire a subsequent new image target frame; determine a plurality of corresponding sample points in the new image target frame wherein the plurality of corresponding sample points correspond to the plurality of sample points in the reference image target frame; compare a color of each of the plurality of sample points in the reference image target frame with a color of each of the corresponding sample points in the new image target frame and compute a Color Transfer function based at least in part on the comparison; and apply the Color Transfer function to the color of the virtual object.

A further embodiment disclosed herein may include a non-transitory computer-readable medium including code that, when executed by a processor, causes the processor to: select a reference image target frame; select a plurality of sample points in the reference image target frame; acquire a subsequent new image target frame; determine a plurality of corresponding sample points in the new image target frame wherein the plurality of corresponding sample points correspond to the plurality of sample points in the reference image target frame; compare a color of each of the plurality of sample points in the reference image target frame with a color of each of the corresponding sample points in the new image target frame and compute a Color Transfer function based at least in part on the comparison; and apply the Color Transfer function to the color of the virtual object.

An additional embodiment disclosed herein may include an apparatus for creating a realistic color for a virtual object in an Augmented Reality environment comprising: means for selecting a reference image target frame; means for selecting a plurality of sample points in the reference image target frame; means for acquiring a subsequent new image target frame; means for determining a plurality of corresponding sample points in the new image target frame wherein the plurality of corresponding sample points correspond to the plurality of sample points in the reference image target frame; means for comparing a color of each of the plurality of sample points in the reference image target frame with a color of each of the corresponding sample points in the new image target frame and for computing a Color Transfer function based at least in part on the comparison; and means for applying the Color Transfer function to the color of the virtual object.

DETAILED DESCRIPTION

Figure 1:
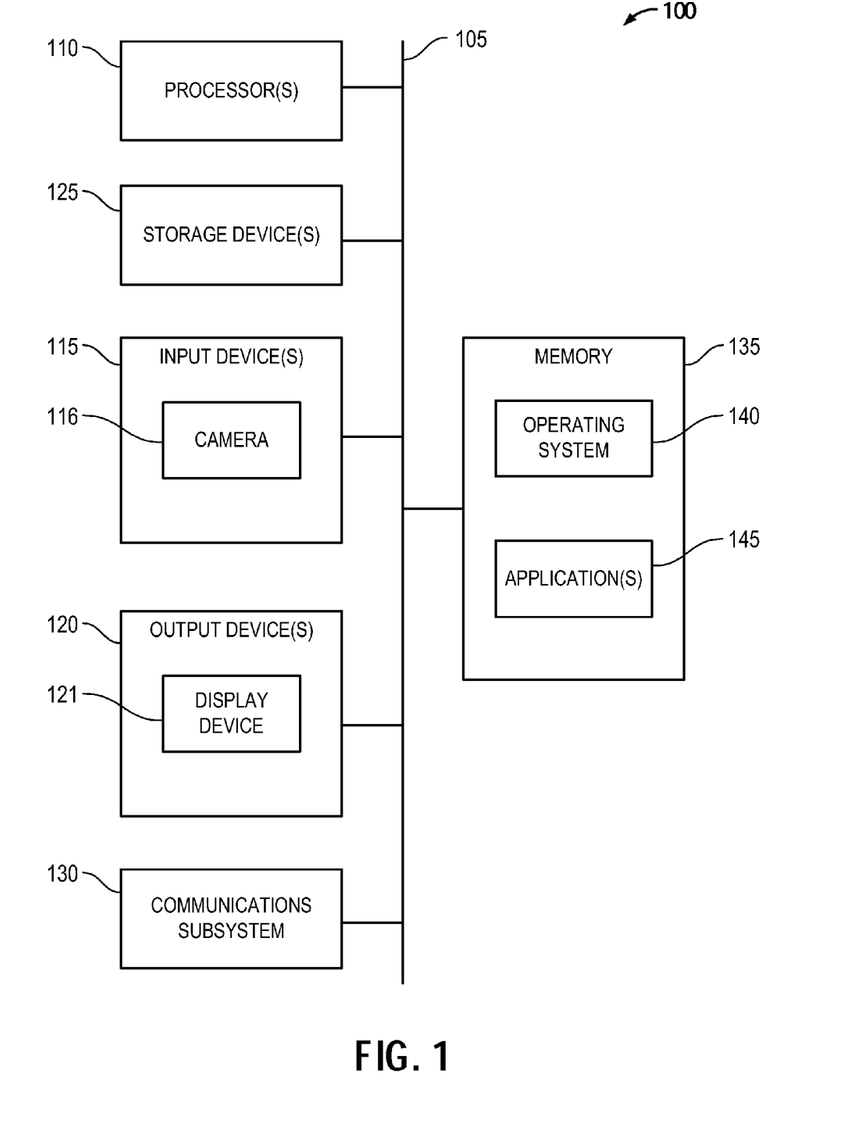
FIG. 1 illustrates an embodiment of a device adapted for Augmented Reality applications.

An example device 100 adapted for Augmented Reality applications is illustrated in FIG. 1. The device as used herein (e.g., device 100) may be a: mobile device, wireless device, cell phone, personal digital assistant, mobile computer, wearable device (e.g., watch, head mounted display, virtual reality glasses, etc.), tablet, personal computer, laptop computer, or any type of device that has processing capabilities. As used herein, a mobile device may be any portable, or movable device or machine that is configurable to acquire wireless signals transmitted from, and transmit wireless signals to, one or more wireless communication devices or networks. Thus, by way of example but not limitation, the device 100 may include a radio device, a cellular telephone device, a computing device, a personal communication system device, or other like movable wireless communication equipped device, appliance, or machine.

The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which include at least a camera 116, and can further include without limitation a mouse, a keyboard, keypad, touch-screen, microphone and/or the like; and one or more output devices 120, which include at least a display device 121, and can further include without limitation a speaker, a printer, and/or the like.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device may also include a communication subsystem 130, which can include without limitation a modem, a network card (wireless or wired), an infrared communication device, a wireless communication device and/or chipset (such as a Bluetooth device, an 802.11 device, a Wi-Fi device, a WiMax device, cellular communication facilities, etc.), and/or the like. The communications subsystem 130 may permit data to be exchanged with a network, other devices, and/or any other devices described herein. In one embodiment, the device 100 may further comprise a memory 135, which can include a RAM or ROM device, as described above. It should be appreciated that device 100 may be a mobile device or a non-mobile device, and may have wireless and/or wired connections.

The device 100 may also comprise software elements, shown as being currently located within the working memory 135, including an operating system 140, device drivers, executable libraries, and/or other code, such as one or more application programs 145, which may comprise or may be designed to implement methods, and/or configure systems, provided by embodiments, as will be described herein. Merely by way of example, one or more procedures described with respect to the method(s) discussed below might be implemented as code and/or instructions executable by device 100 (and/or a processor 110 within device 100); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a device, such as the device 100. In other embodiments, the storage medium might be separate from a device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

Application programs 145 may include one or more Augmented Reality applications. An example Augmented Reality application is capable of recognizing and tracking image targets in real time. In one exemplary embodiment, the example Augmented Reality application tracks image targets using a plurality of keypoints on the image targets. It should be appreciated that the functionality of the Augmented Reality application described hereinafter may be alternatively implemented in hardware or different levels of software, such as an operating system (OS), a firmware, a computer vision module, etc.

In one embodiment, image targets, representing a real world scene, are frames of a live video feed received from the camera 116 of the device 100. The video feed may be buffered. In another embodiment, the video feed may be a pre-recorded video feed and may be retrieved from a storage medium. The Augmented Reality application 145 may superimpose one or more virtual objects on the image targets. The image targets, on which the one or more virtual objects are superimposed, are then rendered frame-by-frame on the display device 121. Because the example Augmented Reality application tracks the position and orientation of the image targets and adjusts the position and orientation of the superimposed one or more virtual objects accordingly, a user's perspective on the one or more virtual objects corresponds with his or her perspective on the image targets, and as a result, it appears to the user that the one or more virtual objects are a part of the real world scene. Also, in one embodiment, the image targets that represent the real world scene may be frames of a saved video feed.

Figure 2:
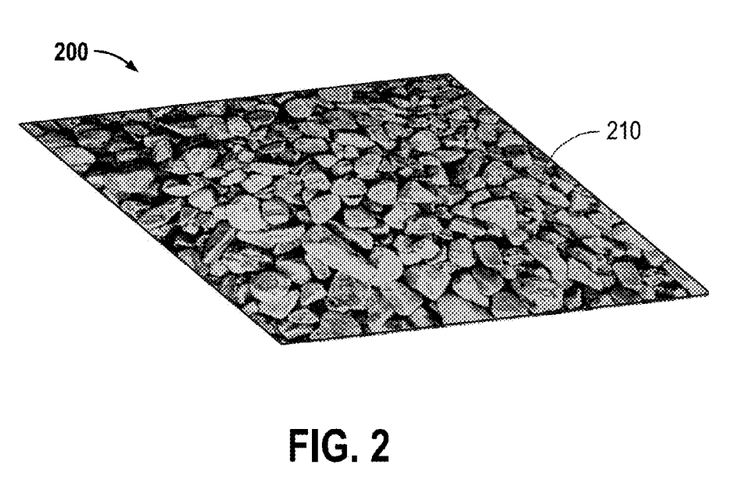
FIG. 2 illustrates an image target frame.
Figure 3:
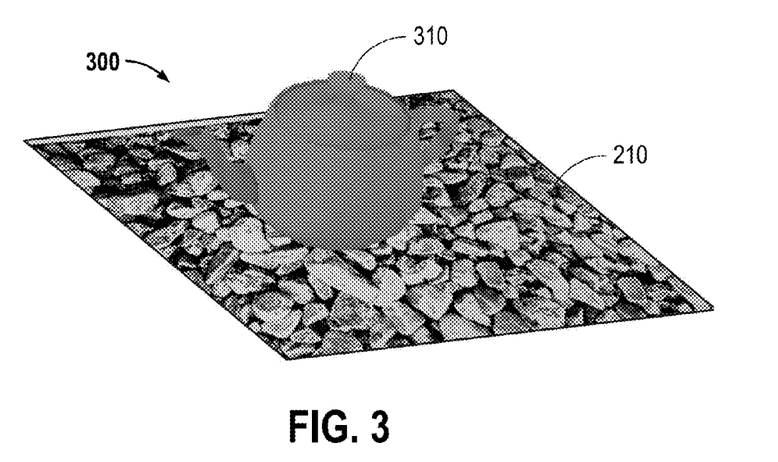
FIG. 3 illustrates an image target frame augmented with a virtual teapot.

FIG. 2 illustrates one example of an image target frame 210 including a table top. FIG. 3 illustrates the example image target frame 210, superimposed by a virtual object, a teapot 310, on the table top.

It should be apparent to those skilled in the art that when an Augmented Reality application only tracks the position and orientation of the image targets, but not their visual appearances, the realism of the one or more superimposed virtual objects may diminish under certain conditions. For example, when there is a change of the lighting condition in the image targets, if the Augmented Reality application does not track the visual appearances of the image targets, the hue of the one or more virtual objects will not change in response to the changed lighting condition, as the hue of a real object in the image targets would. A perceptible loss of realism therefore may result. In order to address this problem, a method and apparatus to create a realistic color for an Augmented Reality environment produced by Augmented Reality application 145 is disclosed. Color Transfer techniques are disclosed herein that track changes in color measurements in image targets, and then adjust the colors of the one or more virtual objects accordingly.

Figure 4:
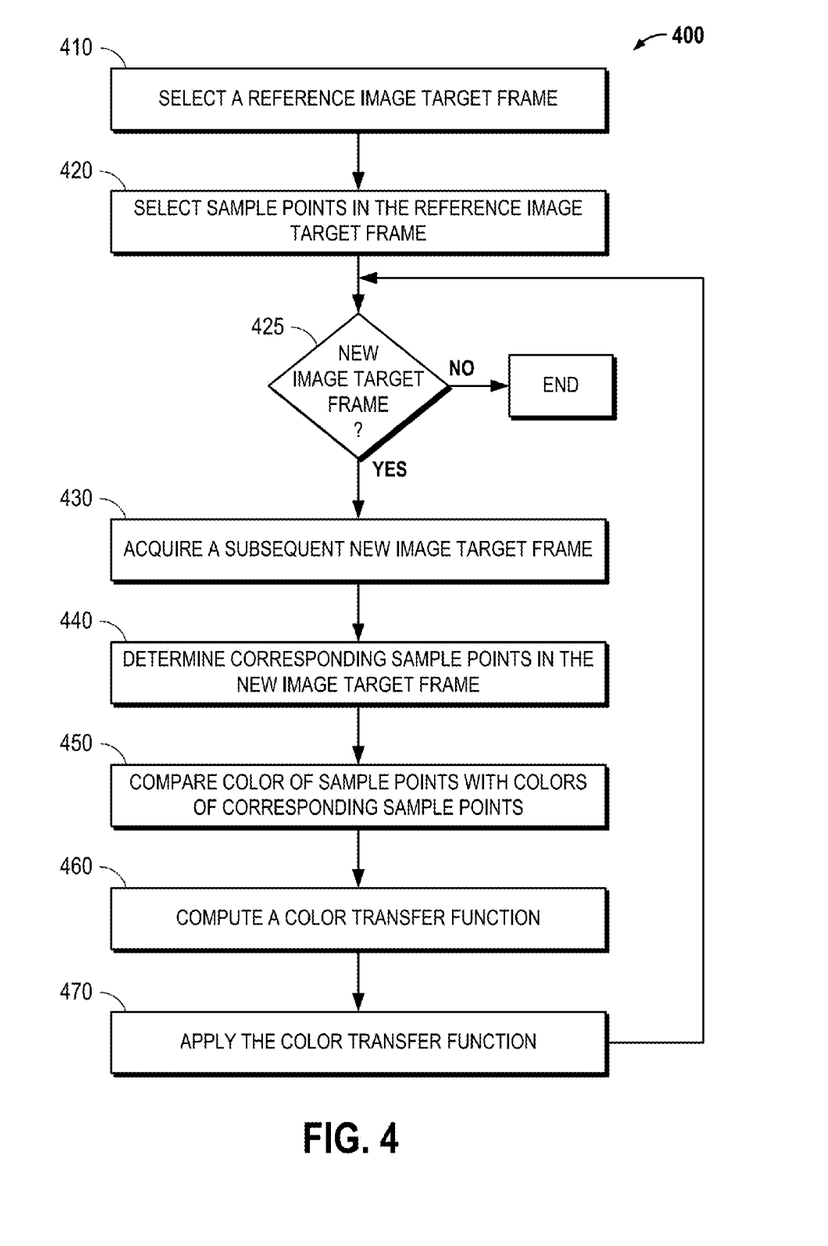
FIG. 4 illustrates a method for creating a realistic color for a virtual object in an Augmented Reality environment, according to one embodiment.

FIG. 4 illustrates an embodiment of a method to implement the color transfer techniques. At operation 410, a reference image target frame is selected. In different embodiments, different methods for selecting a reference image target frame may be utilized. By way of example, in one embodiment, a user may designate an image target frame with a neutral lighting condition as the reference image target frame in the Augmented Reality application 145. In another embodiment, the Augmented Reality application may select the first image target frame as the reference image target frame.

Next, at operation 420, sample points are selected in the reference image target frame. In different embodiments, different methods for selecting sample points may be utilized. By way of example, in one embodiment, the sample points selected may be the same as the keypoints of the Augmented Reality application 145. In another embodiment, sample points may be selected to maximize the range of the colors covered by the sample points. For example, sufficient sample points may be selected to cover red hue, green hue, and blue hue in each of low, medium, and high saturation levels and each of low, medium, and high brightness levels.

In yet another embodiment, sample points may be selected to span a large portion of the reference image target frame so that an uneven change of the lighting condition in subsequent image target frames can be captured. A substantially large portion of a reference image target frame may cover, for example, 70 percent of the reference image target frame. It should be appreciated that the more the sample points, the more accurate the Color Transfer results.

In some embodiments, sample points may be selected within the area on the reference image where the one or more virtual objects are to be placed. In some additional embodiments, sample points may be selected outside the area on the reference image where the one or more virtual objects are to be placed.

Figure 5:
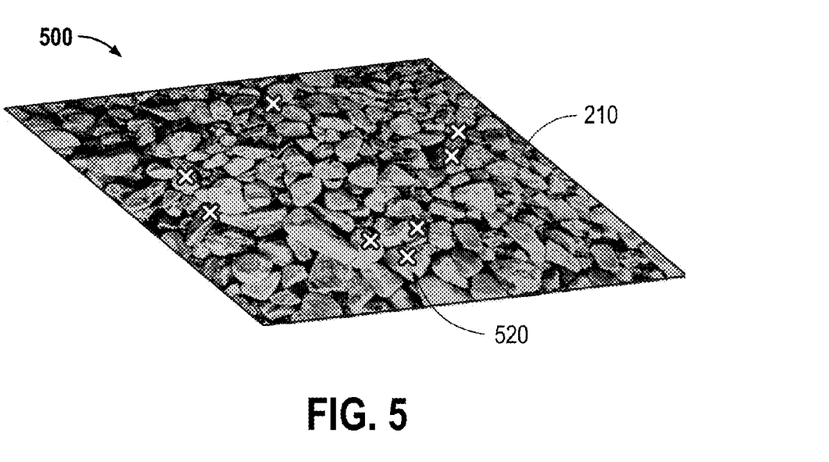
FIG. 5 illustrates a reference image target frame with sample points selected therein.

With brief reference to FIG. 5, FIG. 5 illustrates an example 500 of the sample reference image target frame 210 with sample points 520 selected therein. As described herein, different methods for selecting sample points 520 may be utilized. It should be appreciated that FIG. 5 is a conceptual illustration only, and sample points 520 may be displayed differently, or may not be displayed at all when embodiments of the present invention are utilized. It should also be appreciated that the number and the locations of sample points 520 shown in FIG. 5 are not representative of the number and the locations of sample points in actual use in the embodiments of the present invention, but is merely for illustrative purposes.

Returning to FIG. 4, a subsequent new image target frame is acquired by the Augmented Reality application 145 at operation 430 if it is determined at operation 425 that there is one. If not, the process ends. At operation 440, sample points in the new image target frame that correspond to sample points in the reference image target frame are determined based at least in part on the pose change tracked by the Augmented Reality application 145. A first sample point in a first image target frame corresponds to a second sample point in a second image target frame when the two sample points correspond to the same physical location in the real world. Methods for determining corresponding sample points with an Augmented Reality application are known in the art. At the following operation 450, a color comparison is made between each of the sample points in the reference image target frame and the corresponding sample points in the new image target frame.

At the next operation 460, a Color Transfer function is computed from the result of the color comparison performed at operation 450. Next, at operation 470, the color transfer function is applied. In one embodiment, the Color Transfer function may be based upon a color measurement of a sample point in the reference image target frame, a color measurement of a corresponding sample point in the new image target frame, and a color of the one or more virtual objects before Color Transfer.

In one embodiment, the Color Transfer function may be generally represented as a function of the form $F(R, S, c) \rightarrow t$, wherein R is a color measurement in the reference image target frame, wherein S is a color measurement in the subsequent new image target frame, wherein c is a color of the one or more virtual objects before Color Transfer, and wherein t is a resulting color of c after Color Transfer.

In another embodiment, the Color Transfer function takes color measurement differences between the sample points in the reference image target frame and the corresponding sample points in the new image target frame, and adds them to the colors of the one or more virtual objects.

Two embodiments of methods of computing a Color Transfer function are particularly disclosed herein, but embodiments of the invention are not so limited. A Color Transfer function may comprise one or more Color Transfer sub-functions, the number of the sub-functions being the number of colors present in the one or more virtual objects. Alternatively, for each virtual object, a respective Color Transfer function may be computed. A plurality of Color Transfer functions may be computed for a reference image target frame where a plurality of virtual objects are superimposed.

Figure 6:
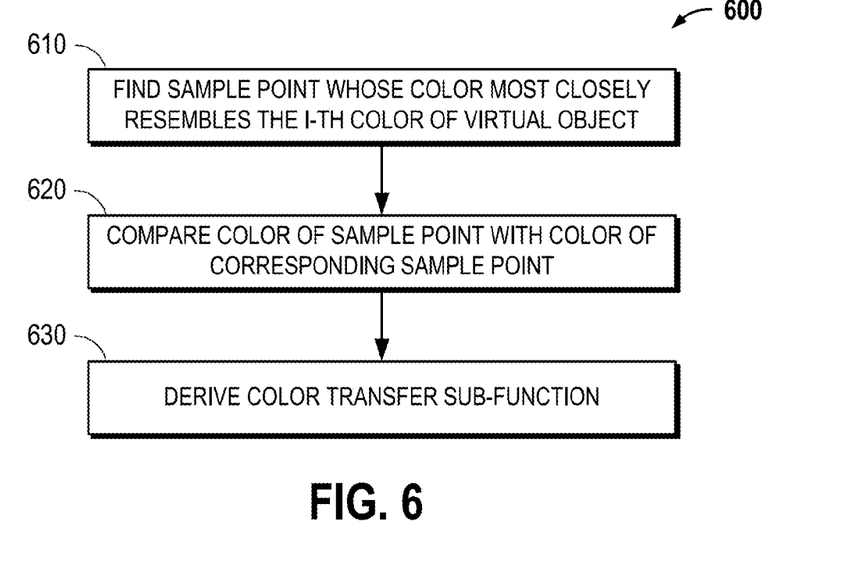
FIG. 6 illustrates an embodiment of a method for computing a Color Transfer sub-function.

FIG. 6 illustrates an embodiment of a method of computing a Color Transfer sub-function. In this embodiment, for the i-th color of the one or more virtual objects before Color Transfer, $c_i$, at operation 610, a sample point in the reference image target frame whose color most closely resembles $c_i$ is found. $R_i$ denotes a color measurement of the sample point found at operation 610. At the next operation 620, a color comparison is performed between $R_i$ and the color measurement of the corresponding sample point in the new image target frame that corresponds to the sample point found at operation 610. $S_i$ denotes a color measurement of the corresponding sample point in the new image target frame, and $S_i - R_i$ denotes the difference between $S_i$ and $R_i$. At operation 630, the Color Transfer sub-function for $c_i$ is derived as: $t_i = (S_i - R_i) + c_i$, $t_i$ denoting the resulting color of $c_i$ after Color Transfer. Operations 610 through 630 are repeated for each color of the one or more virtual objects.

Figure 7:
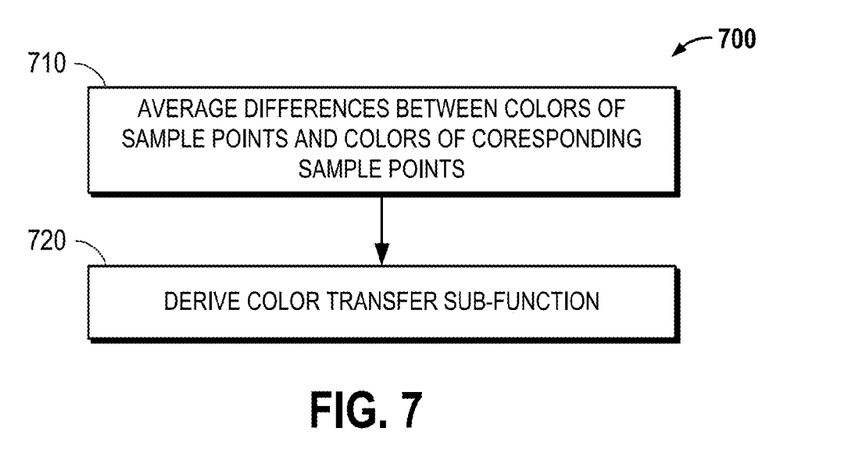
FIG. 7 illustrates another embodiment of a method for computing a Color Transfer sub-function.

FIG. 7 illustrates another embodiment of a method of computing a Color Transfer sub-function. In this embodiment, at operation 710, color measurement differences between sample points in the reference image target frame and corresponding sample points in the new image target frame are taken and averaged. The result of operation 710 may be represented as $$\frac{1}{n}\sum_{j=1}^{n}(S_j - R_j).$$

n is the number of sample points; $R_j$ denotes a color measurement of the j-th sample point; and $S_j$ denotes a color measurement of the corresponding sample point in the new image target frame that corresponds to the j-th sample point. At operation 720, the Color Transfer sub-function for $c_i$ is derived as:

$$ti = \frac{1}{n}\sum_{j=1}^{n}(S_j - R_j) + ci.$$

It should be appreciated that operation 710 needs to be performed only once for each new image target frame because the result of operation 710 is independent of ci.

Referring back to FIG. 4, after the Color Transfer function has been computed at operation 460, at the next operation 470, the Color Transfer function is applied to the colors of the one or more virtual objects.

Figure 8:
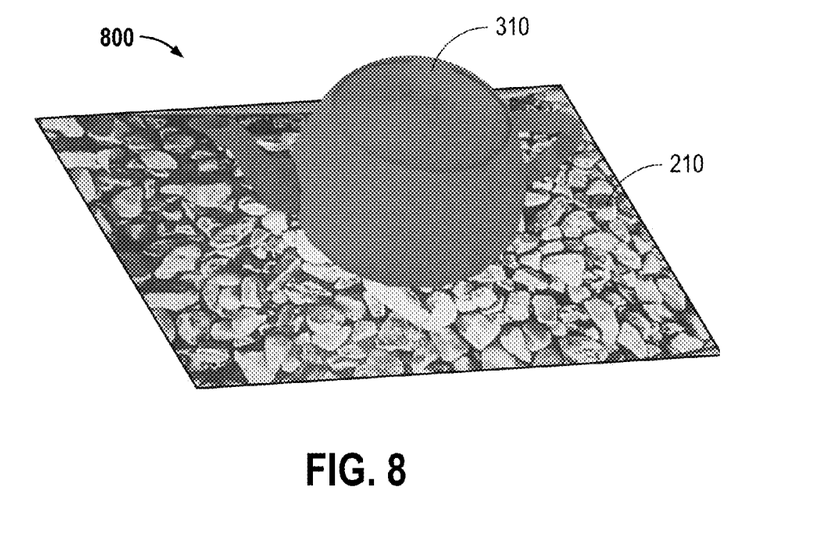
FIG. 8 illustrates an image target frame with a changed lighting condition augmented with a virtual teapot without Color Transfer.
Figure 9:
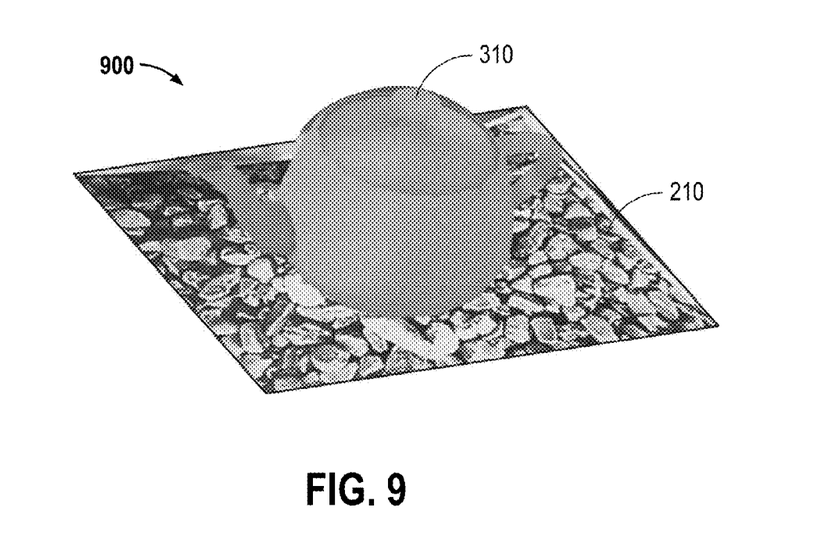
FIG. 9 illustrates an image target frame with a changed lighting condition augmented with a virtual teapot with Color Transfer.

FIG. 8 illustrates an example image 800 of a virtual teapot 310 superimposed on an image target frame 210 with a changed lighting condition without Color Transfer. It can be seen that the virtual teapot 310 appears unrealistic because its hue does not reflect the changed lighting condition in the image target frame 210. FIG. 9 illustrates an example image 900 of a virtual teapot 310 superimposed on an image target frame 210 with a changed lighting condition with one of the previously described Color Transfer functions applied. It can be seen that the applied Color Transfer function makes the virtual teapot 310 appear more realistic.

Also, in one additional embodiment, Color Transfer can be performed in an intermediary color space, such as CIELab or CIELuv. In this embodiment, R, S, and c may be first converted into an intermediary color space. Color Transfer may then be performed in the intermediary color space. And last, the resulting t is converted back into the target color space. In one embodiment, the original and the target color space is the RGB color space. An intermediary color space may be more suitable for Color Transfer operations. Examples of such intermediary color spaces may include the HSV color space (which uses Brightness, Saturation and Hue instead of the primary colors) and the CIELab color space (which is perceptually linear for humans). A variety of colors spaces, such as YUV, YCbCr, RGB, HSV, HSL, etc., can be used as an intermediary color space if desired.

As can be seen in FIG. 8, the virtual object (virtual teapot 310) is unrealistic in the example image 800 because its hue does not reflect the changed lighting condition in the image target frame 210. Compared to the neutral colors illustrated in the example image 300 in FIG. 3, the colors of the image target frame 210 in the example image 800 are much brighter, while at the same time the colors of the virtual teapot 310 in the example image 800 remain neutral. As a result of the color disparity in the example image 800 between the image target frame 210 and the virtual teapot 310, the virtual teapot 310 in the example image 800 appears unrealistic. By performing the previously described functions, in which a device 100 having a processor 110 may execute instructions to operate an Augmented Reality application 145 to create a realistic color for a virtual object (virtual teapot 310), the example image 800 of FIG. 8 can be transformed into the more realistically colored example image 900 of virtual teapot 310 in FIG. 9, wherein the colors of the virtual teapot 310, consistent with the colors of the image target frame 210, are also much brighter compared to the neutral colors of the virtual teapot 310 in the example image 300.

In particular, as previously described, operations may be performed by the device 100 to: select a reference image target frame 210 (FIG. 8); select a plurality of sample points in the reference image target frame; acquire a subsequent new image target frame 210 (FIG. 9); determine a plurality of corresponding sample points in the new image target frame wherein the plurality of corresponding sample points correspond to the plurality of sample points in the reference image target frame; compare a color of each of the plurality of sample points in the reference image target frame (FIG. 8) with a color of each of the corresponding sample points in the new image target frame (FIG. 9); and compute a Color Transfer function based at least in part on the comparison. Various implementations of Color Transfer functions have been previously described in detail. Based upon the Color Transfer function utilized, the Color Transfer function is applied to the color of the virtual teapot 310 of FIG. 8 to make the color of the virtual teapot much more realistic, as can be seen in FIG. 9.

It should be appreciated that Augmented Reality application 145 to perform color transfer functions, as previously described, may be implemented as software, firmware, hardware, combinations thereof, etc. In one embodiment, the previous described functions may be implemented by one or more processors (e.g., processor 110) of a device 100 to achieve the previously desired functions (e.g., the method operations of FIGS. 4, 6, and 7).

The teachings herein may be incorporated into (e.g., implemented within or performed by) a variety of apparatuses (e.g., devices). For example, one or more aspects taught herein may be incorporated into a general device, a desktop computer, a mobile computer, a mobile device, a phone (e.g., a cellular phone), a personal data assistant, a tablet, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, a wearable device (e.g., watch, head mounted display, virtual reality glasses, etc.), an electronic device within an automobile, or any other suitable device.

In some aspects a wireless device may comprise an access device (e.g., a Wi-Fi access point) for a communication system. Such an access device may provide, for example, connectivity to another network through transceiver (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

It should be appreciated that when the devices are mobile or wireless devices that they may communicate via one or more wireless communication links through a wireless network that are based on or otherwise support any suitable wireless communication technology. For example, in some aspects the wireless device and other devices may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, 3G, LTE, Advanced LTE, 4G, CDMA, TDMA, OFDM, OFDMA, WiMAX, and WiFi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, engines, circuits, and algorithm steps described in connection with the embodiments disclosed herein may be implemented as electronic hardware, computer software, or combinations of both. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions or modules may be stored on or transmitted over as one or more instructions or code on a non-transitory computer-readable medium. Computer-readable media can include both computer storage media and communication media including any medium that facilitates transfer of a computer program from one place to another. A storage media may be any available media that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of non-transitory computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of creating a realistic color for a virtual object in an Augmented Reality environment comprising:
    selecting a reference image target frame;
    selecting a plurality of sample points in the reference image target frame;
    acquiring a subsequent new image target frame;
    determining a plurality of corresponding sample points in the new image target frame wherein the plurality of corresponding sample points correspond to the plurality of sample points in the reference image target frame;
    comparing a color of each of the plurality of sample points in the reference image target frame with a color of each of the corresponding sample points in the new image target frame and computing a Color Transfer function based at least in part on the comparison; and
    applying the Color Transfer function to the color of the virtual object,
    wherein the Color Transfer function is based upon a color measurement of a sample point in the reference image target frame, a color measurement of a sample point in the new image target frame, and a color of the virtual object before Color Transfer.

2. The method of claim 1, wherein the plurality of sample points selected are the same as at least some of the keypoints of the reference image target frame.

3. The method of claim 1, wherein the plurality of sample points are selected to maximize a range of colors covered by the plurality of sample points.

4. The method of claim 1, wherein the plurality of sample points are selected to span a substantially large portion of the reference image target frame.

5. The method of claim 1, wherein the Color Transfer function is of a form of F(R, S, c)→t, wherein R is a color measurement in the reference image target frame, wherein S is a color measurement in the new image target frame, wherein c is a color of the virtual object before Color Transfer, and wherein t is a resulting color of c after Color Transfer.

6. The method of claim 5, wherein the Color Transfer function is further of a form of ti=(Si−Ri)+ci, wherein ci is the i-th color of the virtual object, wherein Ri is a color measurement of a sample point whose color most closely resembles ci, wherein Si is a color measurement of a corresponding sample point corresponding to Ri, and wherein ti is a resulting color of ci after Color Transfer.

7. The method of claim 5, wherein the Color Transfer function is further of a form of $$t = \frac{1}{n}\sum_{j=1}^{n}(S_j - R_j) + c,$$

wherein n is the number of sample points in the reference image target frame.

8. The method of 1, wherein applying the Color Transfer function further comprises applying the Color Transfer function in an intermediary color space, and converting a resulting color to a target color space.

9. An apparatus for creating a realistic color for a virtual object in an Augmented Reality environment comprising:
a memory; and
a processor, coupled to the memory, configured to execute instructions to:
select a reference image target frame;
select a plurality of sample points in the reference image target frame;
acquire a subsequent new image target frame;
determine a plurality of corresponding sample points in the new image target frame wherein the plurality of corresponding sample points correspond to the plurality of sample points in the reference image target frame;
compare a color of each of the plurality of sample points in the reference image target frame with a color of each of the corresponding sample points in the new image target frame and compute a Color Transfer function based at least on part on the comparison; and
apply the Color Transfer function to the color of the virtual object,
wherein the Color Transfer function is based upon a color measurement of a sample point in the reference image target frame, a color measurement of a sample point in the new image target frame, and a color of the virtual object before Color Transfer.

10. The apparatus of claim 9, wherein the plurality of sample points selected are the same as at least some of the keypoints of the reference image target frame.

11. The apparatus of claim 9, wherein the plurality of sample points are selected to maximize a range of colors covered by the plurality of sample points.

12. The apparatus of claim 9, wherein the plurality of sample points are selected to span a substantially large portion of the reference image target frame.

13. The apparatus of claim 9, wherein the Color Transfer function is of a form of F(R, S, c)→t, wherein R is a color measurement in the reference image target frame, wherein S is a color measurement in the new image target frame, wherein c is a color of the virtual object before Color Transfer, and wherein t is a resulting color of c after Color Transfer.

14. The apparatus of claim 13, wherein the Color Transfer function is further of a form of ti=(Si−Ri)+ci, wherein ci is the i-th color of the virtual object, wherein Ri is a color measurement of a sample point whose color most closely resembles ci, wherein Si is a color measurement of a corresponding sample point corresponding to Ri, and wherein ti is a resulting color of ci after Color Transfer.

15. The apparatus of claim 13, wherein the Color Transfer function is further of a form of $$t = \frac{1}{n}\sum_{j=1}^{n}(S_j - R_j) + c,$$

wherein n is the number of sample points in the reference image target frame.

16. The apparatus of 9, wherein the processor configured to execute instructions to apply the Color Transfer function is further configured to apply the Color Transfer function in an intermediary color space, and to convert a resulting color to a target color space.

17. A non-transitory computer-readable medium including code that, when executed by a processor, causes the processor to:
select a reference image target frame;
select a plurality of sample points in the reference image target frame;
acquire a subsequent new image target frame;
determine a plurality of corresponding sample points in the new image target frame wherein the plurality of corresponding sample points correspond to the plurality of sample points in the reference image target frame;
compare a color of each of the plurality of sample points in the reference image target frame with a color of each of the corresponding sample points in the new image target frame and compute a Color Transfer function based at least in part on the comparison; and
apply the Color Transfer function to the color of the virtual object,
wherein the Color Transfer function is based upon a color measurement of a sample point in the reference image target frame, a color measurement of a sample point in the new image target frame, and a color of the virtual object before Color Transfer.

18. The computer-readable medium of claim 17, wherein the plurality of sample points selected are the same as keypoints of the reference image target frame.

19. The computer-readable medium of claim 17, wherein the plurality of sample points are selected to maximize a range of colors covered by the plurality of sample points.

20. The computer-readable medium of claim 17, wherein the plurality of sample points are selected to span a substantially large portion of the reference image target frame.

21. The apparatus of claim 17, wherein the Color Transfer function is of a form of F(R, S, c)→t, wherein R is a color measurement in the reference image target frame, wherein S is a color measurement in the new image target frame, wherein c is a color of the virtual object before Color Transfer, and wherein t is a resulting color of c after Color Transfer.

22. The computer-readable medium of claim 21, wherein the Color Transfer function is further of a form of ti=(Si−Ri)+ ci, wherein ci is the i-th color of the virtual object, wherein Ri is a color measurement of a sample point whose color most closely resembles ci, wherein Si is a color measurement of a corresponding sample point corresponding to Ri, and wherein ti is a resulting color of ci after Color Transfer.

23. The computer-readable medium of claim 21, wherein the Color Transfer function is further of a form of $$t = \frac{1}{n}\sum_{j=1}^{n}(S_j - R_j) + c,$$

wherein n is the number of sample points in the reference image target frame.

24. The computer-readable medium of 17, wherein the code to apply the Color Transfer function further comprises code to apply the Color Transfer function in an intermediary color space, and to convert a resulting color to a target color space.

25. An apparatus for creating a realistic color for a virtual object in an Augmented Reality environment comprising:
- means for selecting a reference image target frame;
- means for selecting a plurality of sample points in the reference image target frame;
- means for acquiring a subsequent new image target frame;
- means for determining a plurality of corresponding sample points in the new image target frame wherein the plurality of corresponding sample points correspond to the plurality of sample points in the reference image target frame;
- means for comparing a color of each of the plurality of sample points in the reference image target frame with a color of each of the corresponding sample points in the new image target frame and for computing a Color Transfer function based at least in part on the comparison; and
- means for applying the Color Transfer function to the color of the virtual object,
- wherein the Color Transfer function is based upon a color measurement of a sample point in the reference image target frame, a color measurement of a sample point in the new image target frame, and a color of the virtual object before Color Transfer.

26. The apparatus of claim 25, wherein the plurality of sample points selected are the same as keypoints of the reference image target frame.

27. The apparatus of claim 25, wherein the plurality of sample points are selected to maximize a range of colors covered by the plurality of sample points.

* * * * *